US010654511B1

(12) United States Patent
Cao et al.

(10) Patent No.: US 10,654,511 B1
(45) Date of Patent: May 19, 2020

(54) METHODS FOR STEERING SYSTEM IMPEDANCE CONTROL

(71) Applicant: GM GLOBAL TECHNOLOGY OPERATIONS LLC, Detroit, MI (US)

(72) Inventors: Yu Cao, Courtice (CA); Bo Yu, Novi, MI (US); Raed N. Abuaita, Fenton, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 51 days.

(21) Appl. No.: 16/176,586

(22) Filed: Oct. 31, 2018

(51) Int. Cl.
*B62D 1/181* (2006.01)
*B62D 1/04* (2006.01)
*B62D 1/183* (2006.01)

(52) U.S. Cl.
CPC ............ *B62D 1/181* (2013.01); *B62D 1/04* (2013.01); *B62D 1/183* (2013.01)

(58) Field of Classification Search
CPC ........... B62D 1/181; B62D 1/04; B62D 1/183
USPC ......................................................... 701/49
See application file for complete search history.

(56) References Cited

U.S. PATENT DOCUMENTS

| | | | | |
|---|---|---|---|---|
| 6,889,792 B1* | 5/2005 | Fardoun | ............... | B60R 25/02 180/287 |
| 7,222,878 B2* | 5/2007 | Imamura | ............... | B62D 1/195 280/731 |
| 8,122,994 B2* | 2/2012 | Bluhm | ............... | B62D 5/04 180/287 |
| 2002/0011724 A1* | 1/2002 | Satou | ............... | B62D 1/192 280/777 |
| 2017/0297606 A1* | 10/2017 | Kim | ............... | B62D 1/181 |

* cited by examiner

*Primary Examiner* — Tan Q Nguyen
(74) *Attorney, Agent, or Firm* — Quinn IP Law

(57) ABSTRACT

An exemplary method for controlling a vehicle includes providing a vehicle steering system including a moveable steering column assembly and a moveable steering wheel assembly, a first actuator and a second actuator, the first and second actuators configured to move vehicle steering system from a first position to a second position, providing a plurality of sensors, the sensors configured to measure a force characteristic, providing a controller electronically connected to the sensors and the vehicle steering system, monitoring first sensor data received from the first sensor and second sensor data received from the second sensor, generating a reference model based on a desired output displacement and the first and second sensor data, calculating, a revised output displacement based on the reference model, and automatically generating a first control signal to control the first actuator and a second control signal to control the second actuator.

19 Claims, 4 Drawing Sheets

METHODS FOR STEERING SYSTEM IMPEDANCE CONTROL

INTRODUCTION

The present invention relates generally to the field of vehicles and, more specifically, to steering wheels and steering columns for motor vehicles.

Autonomous and semi-autonomous vehicles may include a telescoping steering column to allow the steering wheel to retract away from the occupant or a foldable steering wheel, among other possible retracting mechanisms, to provide more space in the vehicle cabin. During a retracting, folding, or stowing operation in which the steering wheel column is moving in the axial direction, interference with the retracting, folding, or stowing operation, such as a pinch event, can occur. Methods to provide impedance control for a steering system and prevent pinching events could prevent bodily harm to the occupant and interrupted functionality to the retracting mechanism.

SUMMARY

Embodiments according to the present disclosure provide a number of advantages. For example, embodiments according to the present disclosure apply impedance control of movement of the steering wheel column overload as one method to protect an occupant from pinch events caused by movement of the steering wheel and/or steering wheel column during a stowing event. The impedance control enables a soft contact between the retracting mechanism(s) and the operator's hands. In some embodiments, use of an elastic material at potential pinch points expands the contact area and reduces the possibility of injury to the operator.

In one aspect, a method for controlling a vehicle is disclosed. The method includes the steps of providing a vehicle steering system, the vehicle steering system including a moveable steering column assembly and a moveable steering wheel assembly, a first actuator coupled to the moveable steering column assembly and a second actuator coupled to the moveable steering wheel assembly, the first and second actuators configured to move vehicle steering system from a first position to a second position, providing a first sensor connected to the steering column assembly and a second sensor connected to the steering wheel assembly, the first sensor configured to measure a first force characteristic and the second sensor configured to measure a second force characteristic, providing a controller electronically connected to the first and second sensors and the vehicle steering system, monitoring, by the controller, first sensor data received from the first sensor and second sensor data received from the second sensor, generating, by the controller, a reference model based on a desired output displacement and the first and second sensor data, calculating, by the controller, a revised output displacement based on the reference model, and automatically generating, by the controller, a first control signal to control the first actuator and a second control signal to control the second actuator.

In some aspects, the first actuator is configured to translate the steering column assembly from a first steering column position to a second steering column position.

In some aspects, the first steering column position is an unstowed steering column position and the second steering column position is a stowed steering column position.

In some aspects, the second actuator is configured to translate the steering wheel assembly from a first steering wheel position to a second steering wheel position.

In some aspects, the first steering wheel position is an unstowed steering wheel position and the second steering wheel position is a stowed steering wheel position.

In some aspects, the method further includes detecting, by the controller, a trigger condition, the trigger condition including receipt, by the controller, of an input indicating a mode transition.

In some aspects, the mode transition is a transition from a driver-controlled vehicle mode of operation to an autonomous or semi-autonomous mode of operation.

In some aspects, the first sensor is a force sensor and the first sensor data is data indicative of a first external force applied to the steering column assembly.

In some aspects, the second sensor is a force sensor and the second sensor data is indicative of a second external force applied to the steering wheel assembly.

In some aspects, the controller calculates the revised output displacement using impedance control.

In some aspects, the method further includes determining, by the controller, whether a first condition is satisfied, the first condition including a release of one or both of the first external force on the steering column assembly and the second external force on the steering wheel assembly.

In some aspects, if the first condition is not satisfied, the method includes determining, by the controller, an elapsed time and comparing, by the controller, the elapsed time to a predetermined threshold and if the elapsed time exceeds the threshold, automatically controlling, by the controller, the first actuator to move the steering column assembly to the first steering column position and automatically controlling, by the controller, the second actuator to move the steering wheel assembly to the first steering wheel position.

In another aspect, a method for controlling a vehicle includes the steps of providing a vehicle steering system, the vehicle steering system including a moveable steering column assembly and a moveable steering wheel assembly, the moveable steering column assembly including a first actuator coupled to the moveable steering column assembly and configured to translate the moveable steering column assembly between a first steering column position and a second steering column position, the moveable steering wheel assembly including a first steering wheel member and a second steering wheel member coupled to a shroud assembly, a contact material positioned between the first and second steering wheel members and the shroud assembly, and a second actuator coupled to the moveable steering wheel assembly, the second actuator configured to pivot moveable steering wheel assembly between a first steering wheel position and a second steering wheel position, providing a first sensor connected to the steering column assembly and a second sensor connected to the steering wheel assembly, the first sensor configured to measure a first force characteristic and the second sensor configured to measure a second force characteristic, and providing a controller electronically connected to the first and second sensors and the vehicle steering system. The controller monitors first sensor data received from the first sensor and second sensor data received from the second sensor, generates a reference model based on a desired output displacement and the first and second sensor data, calculates a revised output displacement based on the reference model, and automatically generates a first control signal to control the first actuator and a second control signal to control the second actuator.

In some aspects, the first steering column position is an unstowed steering column position, the second steering column position is a stowed steering column position, the first steering wheel position is an unstowed steering wheel position, and the second steering wheel position is a stowed steering wheel position.

In some aspects, the first sensor is a force sensor and the first sensor data is data indicative of a first external force applied to the steering column assembly and the second sensor is a force sensor and the second sensor data is indicative of a second external force applied to the steering wheel assembly.

In some aspects, the controller calculates the revised output displacement using impedance control.

In some aspects, the method further includes determining, by the controller, whether a first condition is satisfied, the first condition including a release of one or both of the first external force on the steering column assembly and the second external force on the steering wheel assembly.

In some aspects, if the first condition is not satisfied, the method includes determining, by the controller, an elapsed time and comparing, by the controller, the elapsed time to a predetermined threshold and if the elapsed time exceeds the threshold, automatically controlling, by the controller, the first actuator to move the steering column assembly to the first steering column position and automatically controlling, by the controller, the second actuator to move the steering wheel assembly to the first steering wheel position.

In yet another aspect, a vehicle steering system includes a moveable steering column assembly, the moveable steering column assembly including a first actuator coupled to the moveable steering column assembly and configured to translate the moveable steering column assembly between a first position and a second position, a moveable steering wheel assembly, the moveable steering wheel assembly including a first steering wheel member and a second steering wheel member coupled to a shroud assembly, a contact material positioned between the first and second steering wheel members and the shroud assembly, and a second actuator coupled to the moveable steering wheel assembly, the second actuator configured to pivot moveable steering wheel assembly between a first steering wheel position and a second steering wheel position, a first sensor connected to the steering column assembly, the first sensor configured to measure a first force characteristic, a second sensor connected to the steering wheel assembly, the second sensor configured to measure a second force characteristic, and a controller electronically connected to the first and second sensors and the first and second actuators. The controller is configured to monitor first sensor data received from the first sensor and second sensor data received from the second sensor, generate a reference model based on a desired output displacement and the first and second sensor data, calculate a revised output displacement based on the reference model using impedance control, and automatically generate a first control signal to control the first actuator and a second control signal to control the second actuator.

In some aspects, the controller is further configured to determine whether a first condition is satisfied, the first condition including a release of one or both of the first external force on the steering column assembly and the second external force on the steering wheel assembly and, if the first condition is not satisfied, determine an elapsed time and compare the elapsed time to a predetermined threshold and if the elapsed time exceeds the threshold, automatically control the first actuator to move the steering column assembly to the first steering column position and automatically control the second actuator to move the steering wheel assembly to the first steering wheel position.

BRIEF DESCRIPTION OF THE DRAWINGS

The present disclosure will be described in conjunction with the following figures, wherein like numerals denote like elements.

Figure 1:
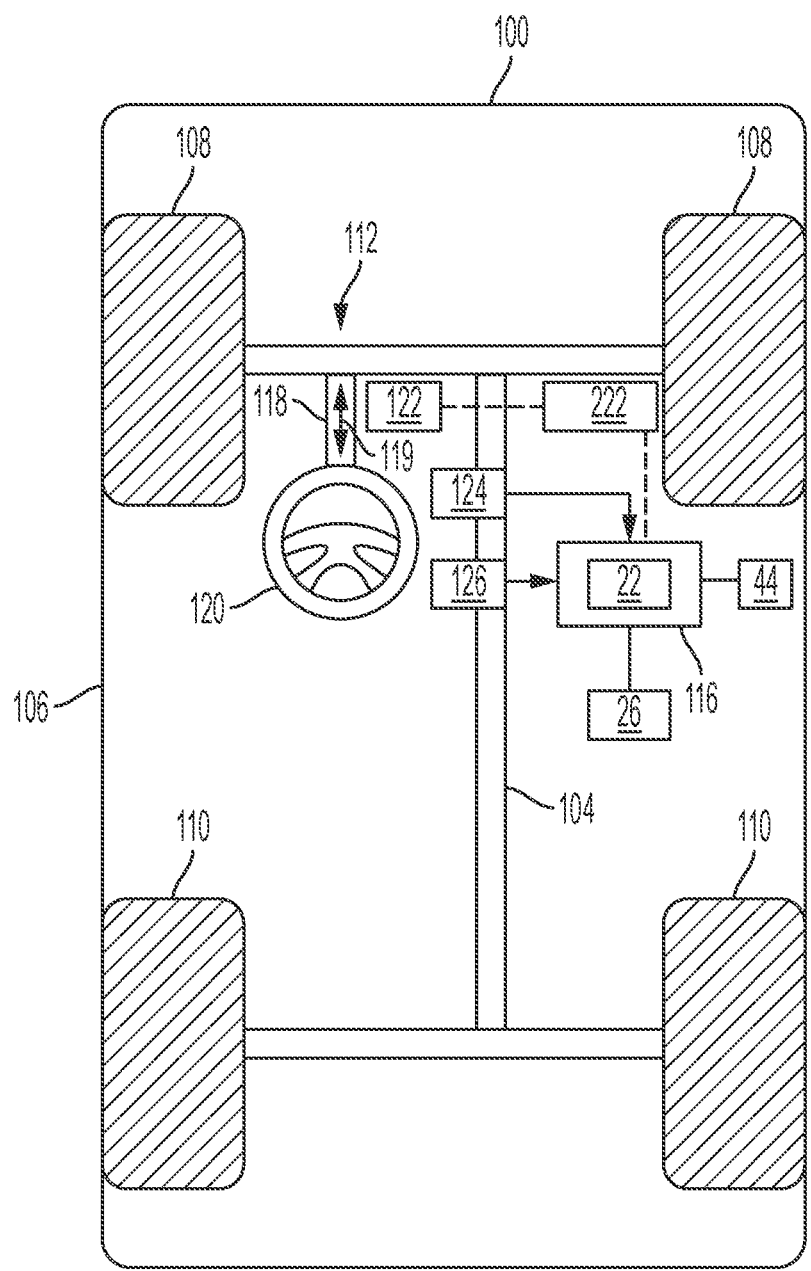
FIG. 1 is a schematic diagram of a vehicle, according to an embodiment.

The foregoing and other features of the present disclosure will become more fully apparent from the following description and appended claims, taken in conjunction with the accompanying drawings. Understanding that these drawings depict only several embodiments in accordance with the disclosure and are not to be considered limiting of its scope, the disclosure will be described with additional specificity and detail through the use of the accompanying drawings. Any dimensions disclosed in the drawings or elsewhere herein are for the purpose of illustration only.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the present invention. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Certain terminology may be used in the following description for the purpose of reference only, and thus are not intended to be limiting. For example, terms such as "above" and "below" refer to directions in the drawings to which reference is made. Terms such as "front," "back," "left," "right," "rear," and "side" describe the orientation and/or location of portions of the components or elements within a consistent but arbitrary frame of reference which is made clear by reference to the text and the associated drawings describing the components or elements under discussion. Moreover, terms such as "first" "second," "third," and so on may be used to describe separate components. Such terminology may include the words specifically mentioned above, derivatives thereof and words of similar import.

Autonomous and semi-autonomous vehicles may include a telescoping steering column or shaft that allows the steering wheel to be stowed within the dashboard when not in use to increase the amount of usable space within the passenger compartment. However, during stowing or unstowing operations, contact with the telescoping column may result in an overload condition that impairs steering column functionality. Additionally, the occupant's hand or finger may be pinched or caught by the moving components of the telescoping column assembly. The methods discussed herein detect overload and pinch events during the stowing and/or unstowing and/or folding operation of the steering column and incorporate control system responses to stop/reverse/pause/etc. the translational motion of the steering column assembly.

With reference to FIG. 1, a vehicle 100 is shown that includes a steering system 112 in accordance with various embodiments. Although the figures shown herein depict an example with certain arrangements of elements, additional intervening elements, devices, features, or components may be present in an actual embodiment. It should also be understood that FIG. 1 is merely illustrative and may not be drawn to scale.

As depicted in FIG. 1, the vehicle 100 generally includes a chassis 104, a body 106, front wheels 108, rear wheels 110, a steering system 112, and a control system 116. The body 106 is arranged on the chassis 104 and substantially encloses the other components of the vehicle 100. The body 106 and the chassis 104 may jointly form a frame. The wheels 108-110 are each rotationally coupled to the chassis 104 near a respective corner of the body 106.

As can be appreciated, the vehicle 100 may be any one of a number of different types of automobiles, such as, for example, a sedan, a wagon, a truck, or a sport utility vehicle (SUV), and may be two-wheel drive (2WD) (i.e., rear-wheel drive or front-wheel drive), four-wheel drive (4WD) or all-wheel drive (AWD). The vehicle 100 may also incorporate any one of, or combination of, a number of different types of propulsion systems, such as, for example, a gasoline or diesel fueled combustion engine, a "flex fuel vehicle" (FFV) engine (i.e., using a mixture of gasoline and ethanol), a gaseous compound (e.g., hydrogen or natural gas) fueled engine, a combustion/electric motor hybrid engine, and an electric motor.

In some embodiments, the vehicle 100 is an autonomous or semi-autonomous vehicle. The vehicle 100, in some embodiments, incorporates various automated driver-assistance systems, such as cruise control, adaptive cruise control, and parking assistance systems correspond to lower automation levels, while true "driverless" vehicles correspond to higher automation levels. In some embodiments, the vehicle 100 includes a stowable steering system 112 that may be stowed within the vehicle console when desired by the vehicle operator or occupant to obtain greater space within the passenger compartment.

In some embodiments, the steering system 112 includes a steering column assembly 118 and a steering wheel assembly 120. The steering column assembly 118 can be a collapsible assembly such that the steering column assembly 118 and the steering wheel assembly 120 can translate axially from a first, or unstowed, position to a second, or stowed, position, or any intermediate position between an unstowed or stowed position, as indicated by the arrow 119. In various embodiments, the steering system 112 is a steer-by-wire system that makes use of electric motors to provide steering assist, sensors to measure steering wheel angle and torque applied by the operator, and a steering wheel emulator to provide torque feedback to the driver. In some embodiments, the steering wheel assembly 120 includes a foldable steering wheel that folds to a smaller profile for easier storage when the steering wheel assembly 120 is in the stowed position.

In various embodiments, the steering system 112 includes at least one motor or actuator 122 that is coupled to the steering column assembly 118 (one motor 122 is shown in FIG. 1). In some embodiments, the motor 122 provides force to the road wheels 108 or provides torque feedback to the vehicle operator for a steer-by-wire steering system 12. In some embodiments, the motor 122 can be coupled to the rotatable shaft of the steering column assembly 118 to enable telescoping functionality of the steering column assembly 118. In some embodiments, one or more motors 122 may be coupled to the steering column assembly 118, with a first motor providing force to the road wheels 108 and a second motor or actuator 122 enabling telescoping functionality of the steering column assembly 118 along a longitudinal axis A of the steering column assembly (see FIG. 3). The actuator 122 moves the steering column assembly between a first steering column position and a second steering column position. As discussed herein, operation of the one or more motors 122 can be monitored and controlled by the control system 116 to determine if an overload and/or pinch condition exists.

The steering system 112 further includes one or more sensors that sense observable conditions of the steering system 112. In various embodiments, the steering system 112 includes a torque sensor 124 and a steering angle sensor 126. The torque sensor 124 senses a rotational torque applied to the steering system by for example, a driver of the vehicle 100 via the steering wheel assembly 120 and generates torque signals based thereon. The steering angle sensor 126 senses a rotational position of the steering wheel 120 and generates position signals based thereon.

With further reference to FIG. 1, the vehicle 100 also includes a plurality of sensors 26 configured to measure and capture data on one or more vehicle characteristics, including but not limited to vehicle speed, vehicle heading, throttle position, ignition status, displacement of a retractable steering column, position of a foldable steering wheel member, etc. The sensors 26 are electronically connected to the control system 116 and provide data on vehicle characteristics and operating conditions. In the illustrated embodiment, the sensors 26 include, but are not limited to, an accelerometer, a position sensor, a speed sensor, a heading sensor, gyroscope, steering angle sensor, or other sensors that sense observable conditions of the vehicle or the environment surrounding the vehicle and may include RADAR, LIDAR, optical cameras, thermal cameras, ultrasonic sensors, infrared sensors, pressures sensors, contact sensors, and/or additional sensors as appropriate.

The control system 116 includes a controller 22. While depicted as a single unit for illustrative purposes, the controller 22 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 22 in controlling the vehicle.

The control system 116 receives the sensor signals and monitors and/or controls operation of the steering system 112 based thereon. In general, the control system 116 receives the sensor signals, and processes the sensor signals over a certain time period to calculate the new desired output displacement based on the feedback force and a pre-set reference model to estimate an interference force, for example and without limitation. In some embodiments, the control system 116 is coupled to the steering column assembly 118.

The vehicle 100 may further include an audio and/or video device 44 coupled to the controller 22 and/or the controller 222. The audio and/or video device 44 is operable to communicate a message to an occupant of the vehicle 100, through either audio or video outputs. For example, the audio and/or video device 44 may include, but is not limited to, speakers, a video screen, or a combination of both. The audio and/or video device 44 is in electronic communication with the controller 22 and/or the controller 222, which provides the output signal for the audio and/or video device 44.

Figure 2:
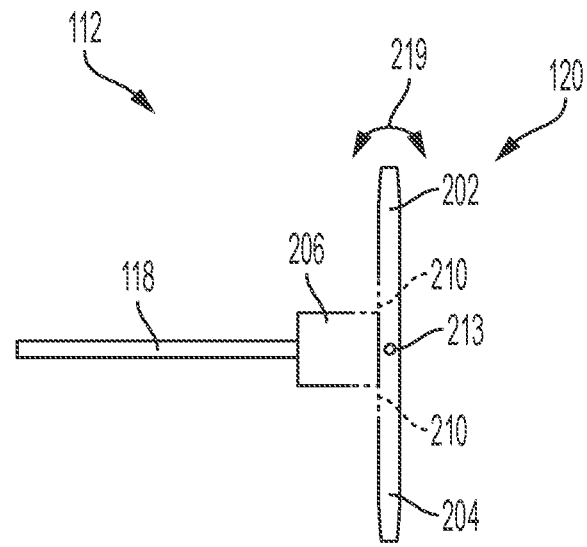
FIG. 2 is a schematic diagram of a steering system of a vehicle, according to an embodiment.
Figure 3:
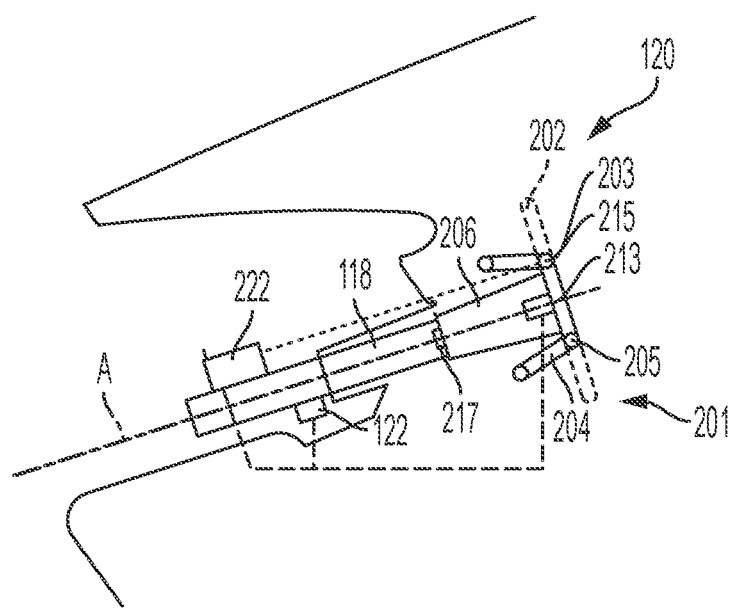
FIG. 3 is another schematic diagram of the steering system of FIG. 2 illustrating aspects of a steering wheel assembly and steering column assembly of the steering system, according to an embodiment.

FIGS. 2 and 3 illustrate a steering wheel assembly 120, according to an embodiment. The steering wheel assembly 120 includes a foldable steering wheel 201 that includes a first steering wheel member 202 and a second steering wheel member 204 coupled to a steering wheel mount and shroud assembly 206. In some embodiments, the first steering wheel member 202 is coupled to the steering wheel mount and shroud assembly 206 at a pivoting member 203, and the second steering wheel member 204 is coupled to the steering wheel mount and shroud assembly 206 at a pivoting member 205.

The pivoting member 203 allows the first steering wheel member 202 to rotate from a first, or unstowed, position to a second, or stowed, position, or any intermediate position between an unstowed or stowed position, as indicated by the arrow 219 in FIG. 2. Similarly, the pivoting member 205 allows the second steering wheel member 204 to rotate from a first, or unstowed, position to a second, or stowed, position, or any intermediate position between an unstowed or stowed position. In some embodiments, a pivot action actuator 213 is positioned within the shroud assembly 206, along a longitudinal axis A of the steering column assembly 118. The actuator 213 acts on each of the first and second steering wheel members 202, 204 to pivot the steering wheel members 202, 204 to and from a first steering wheel position and a second steering wheel position.

With further reference to FIG. 3, the pivot action actuator 213 and the telescoping actuator 122 are electrically connected, via a wired or wireless connection, to a controller 222. In some embodiments, the controller 222 is a steering column controller and is one component of, or electrically connected to, the control system 116. While depicted as a single unit for illustrative purposes, the controller 222 may additionally include one or more other controllers, collectively referred to as a "controller." The controller 22 may include a microprocessor or central processing unit (CPU) or graphical processing unit (GPU) in communication with various types of computer readable storage devices or media. Computer readable storage devices or media may include volatile and nonvolatile storage in read-only memory (ROM), random-access memory (RAM), and keep-alive memory (KAM), for example. KAM is a persistent or non-volatile memory that may be used to store various operating variables while the CPU is powered down. Computer-readable storage devices or media may be implemented using any of a number of known memory devices such as PROMs (programmable read-only memory), EPROMs (electrically PROM), EEPROMs (electrically erasable PROM), flash memory, or any other electric, magnetic, optical, or combination memory devices capable of storing data, some of which represent executable instructions, used by the controller 222 in controlling the vehicle.

As shown in FIG. 1, the controller 222 is, in some embodiments, electrically connected via a wired or wireless connection to the controller 22. In some embodiments, the controllers 22, 222 provide autonomous vehicle control to the vehicle 100.

In addition to the other sensors 26 of the vehicle 100, in some embodiments, the steering wheel assembly 120 includes a steering wheel force sensor 215 and the steering column assembly 118 includes a steering shaft force sensor 217, as shown in FIG. 3. Each of the sensors 215, 217 are electrically connected, via a wired or wireless connection, to the controller 222. The steering wheel force sensor 215 provides data regarding detection of a pinch or impedance force detected when the first and second steering wheel members 202, 204 pivot to the stowed position, for example and without limitation. The steering shaft force sensor 217 provides data regarding detection of a force applied to the steering wheel assembly 120 or the shaft assembly 118, such as, for example and without limitation, a pinch force, pressure applied to the steering wheel by a vehicle occupant, etc. In response to detection of a hands-off or hands-free steering condition, the controller 222 may initiate a folding and/or stowing operation, as discussed in greater detail herein. In response to detection of a pinch force, the controller 222 may terminate a stowing and/or folding operation, as discussed in greater detail herein.

With reference to FIG. 2, in some embodiments, to provide a soft contact point and reduce injury from pinching when the first and second steering wheel members 202, 204 rotate between the first and second positions, a contact material 210 is positioned at the junction between the first steering wheel member 202 and the shroud assembly 206. In some embodiments, the contact material 210 is positioned around the circumference of the junction between the first and second steering wheel members 202, 204 and the shroud assembly 206. In some embodiments, the contact material 210 is positioned discontinuously around the junction between the first and second steering wheel members 202, 204 and the shroud assembly 206. In some embodiments, the contact material 210 is positioned at the top and/or bottom of the junction between the first and second steering wheel members 202, 204 and the shroud assembly 206. In some embodiments, the contact material 210 is an elastically deformable material that deforms in response to an applied force or load and reverts to the original dimension when the load is removed.

Figure 4:
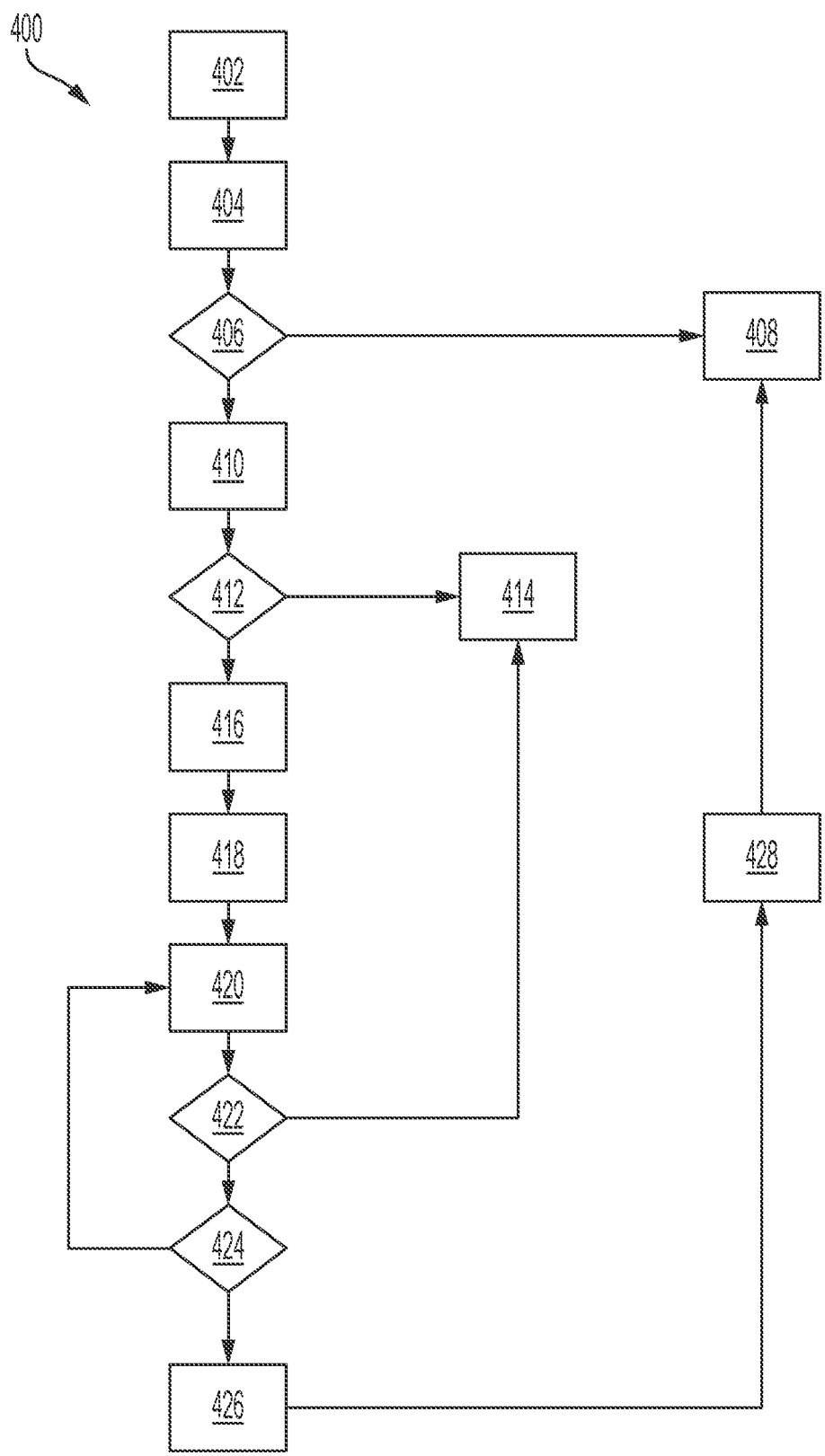
FIG. 4 is a flow diagram of a method to control a vehicle, specifically a steering system of a vehicle, according to an embodiment.
Figure 5:
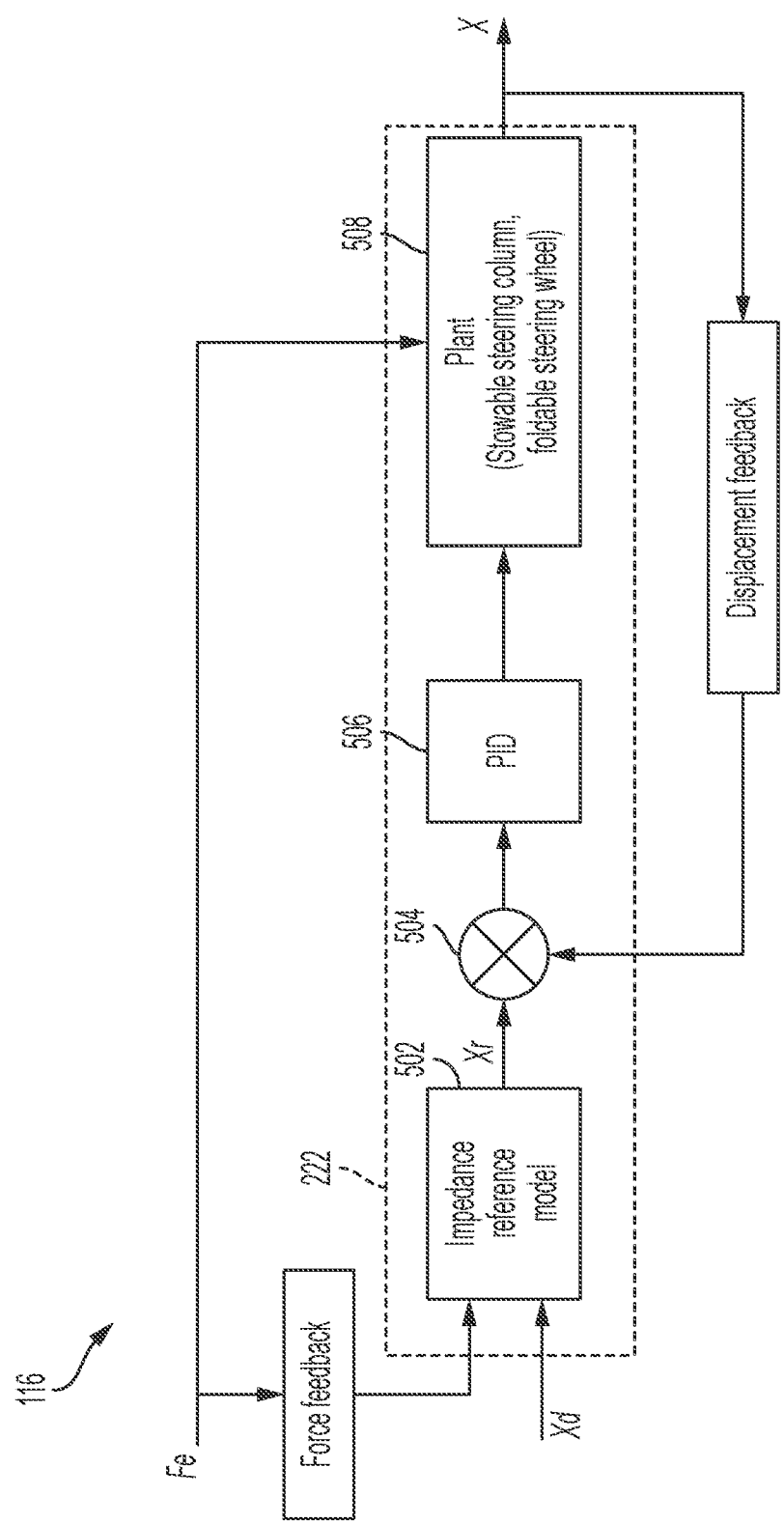
FIG. 5 is a block diagram of a feedback control system used to implement the method illustrated in FIG. 4, according to an embodiment.

FIG. 4 illustrates a method 400 to control the motion of a retractable and/or foldable steering system 112 using impedance control. FIG. 5 is a block diagram of the feedback control system 116 used to implement the impedance control steps of the method 400 using a feedback loop. As is well known, impedance control is a feedback control method designed to control dynamic interaction between a manipulator, such as a retractable and foldable steering system 112, and its environment. The method 400 can be utilized in connection with the steering system 112, the control system 116, and the various sensors 26, 215, 217. The method 400 can be utilized in connection with the controller 22 and/or the controller 222, as discussed herein, or by other systems associated with or separate from the vehicle, in accordance with exemplary embodiments. The order of operation of the method 400 is not limited to the sequential execution as illustrated in FIG. 4, but may be performed in one or more varying orders, or steps may be performed simultaneously, as applicable in accordance with the present disclosure.

The method 400 begins at 402 when a trigger condition is detected. The trigger condition is, in some embodiments, receipt by the controller of an operator input indicating a mode transition. The mode transition is a transition from a driver-controlled vehicle mode of operation to an autonomous or semi-autonomous mode of operation. Next, at 404, the controller performs the transition from the driver-controlled vehicle mode of operation to an autonomous or semi-autonomous mode of operation.

At 406, the controller confirms that an autonomous or semi-autonomous mode of operation is selected and available, given the current vehicle and/or environmental conditions. These conditions may include data regarding the vehicle environment or the vehicle operating condition received from one or more vehicle sensors. If an autonomous or semi-autonomous mode of operation is not confirmed and/or is not available due to current conditions, the method 400 proceeds to 408 and the operator retains control of the vehicle. The controller does not retract and/or fold the steering system 112.

However, if the autonomous or semi-autonomous mode of operation is confirmed and/or is available, the method 400 proceeds to 410. At 410, the controller generates one or more control signals and transmits the control signals to the actuators 122, 213 to fold the steering wheel assembly 120 and/or axially translate or retract the steering column assembly 118.

As the actuators perform the folding and/or retracting actions, the controller determines, at 412, whether a pinch force is detected. In various embodiments, a mathematical model is used to estimate the pinch force or detect an overload condition. The model includes evaluating characteristics and operating parameters of the motor 122 to determine an estimated interference torque. The estimated interference torque is a torque applied to the steering system 112 that affects the stowing process. In some embodiments, a pinch force may be detected by the steering wheel force sensor 215 and/or the steering shaft force sensor 217.

If a pinch force is not detected, the method 400 proceeds to 414 and the stowing and/or folding operation continues until the steering system 112 is stowed within the vehicle console. In some embodiments, without a pinch detection, the steering system 112 components are stowed within approximately 5 seconds and the steering column assembly 118 axially translates approximately 1-250 mm in that time frame. However, other vehicle configurations may have different stowing times and steering column assembly 118 translation distances.

However, if a pinch force is detected, the method 400 proceeds to 416. At 416, a timer incorporated into, or electrically connected to, the controller 22 and/or the controller 222 is initiated and the stowing and/or folding operation is controlled using impedance control incorporating force and displacement feedback. The timer measures an elapsed time since the pinch force was initially detected. A block diagram of one embodiment of a control system, such as the control system 116, that incorporates impedance control with force feedback is illustrated in FIG. 5.

The controller, such as the controller 222 includes an impedance reference model module 502, a comparison module 504, a proportional integral derivative (PID) controller 506, and a plant module 508.

The reference model module 502 receives a desired motion as a command, indicated as $x_d$. The desired motion is a command to axially translate the steering column assembly 118 from the stowed position to the unstowed position or vice versa or any position between the stowed position and the unstowed position. In some embodiments, the desired motion $x_d$ is a command to stow or unstow the steering wheel assembly 120 to a predetermined position. In some embodiments, the desired motion $x_d$ is a combination of axial translation of the steering column assembly 118 and folding or unfolding the steering wheel assembly 120. In some embodiments, the desired motion $x_d$ is received as a user-input command or is based on calculations performed by the controller 22 based on sensor input.

The reference model also receives the force feedback $F_e$. The force feedback is indicative of an external force on the system, such as a pinch force, detected as indicated herein by one or more of the steering wheel force sensor 215 and the steering shaft force sensor 217. The reference model, defined below, governs the desired output displacement based on the feedback force and the pre-defined model.

The reference model is defined by Equation 1:

$$m_r(\ddot{x}_r - \ddot{x}_d) + c_r(\dot{x}_r - \dot{x}_d) + k_r(x_r - x_d) = F_e \qquad \text{Equation 1}$$

Where $x_d$ is the desired tracking output displacement; $x_r$ is the reference output calculated by the reference model; $m_r$, $c_r$, $k_r$ are the reference model parameters that define the softness of the contact and include the mass of the mechanical components, the effective damping, and the effective stiffness; and the feedback force $F_e$ is the external pinch force.

With continued reference to the block diagram of FIG. 5, at 504, the comparison module, the controller 222 receives displacement feedback, x, from one or more sensors. The displacement feedback x is a measured output of the actual displacement of the steering system component, such as, for example and without limitation, the axial translation of the steering column assembly 118 and/or the degree of rotation of the foldable steering wheel members 202, 204. The controller 222 then calculates a difference, or error, between the reference output calculated by the reference model module $x_r$ and the measured, actual displacement.

The PID controller 506 of the controller 222 uses the calculated difference, or error, to generate a revised desired displacement input signal. The revised displacement input signal is used in the plant module 508 to generate x, the actual displacement of the steering system component, such as the axial translation of the steering column assembly 118 and/or the degree of rotation of the foldable steering wheel members 202, 204.

The plant model is defined in Equation 2:

$$M\ddot{x} + B\dot{x} = u + F_e \qquad \text{Equation 2}$$

Where M and B are parameters defining the steering system and u is the error-minimized output from the PID controller 506.

After performing impedance control, as outlined in FIG. 5, and with reference now to FIG. 4, the method 400 proceeds to 418. At 418, the controller generates a message, such as a warning message indicating the detection of a pinch condition, and transmits this message to the audio and/or video device 44 coupled to the controller 22 and/or the controller 222.

Next, at 420, the external force is released by the operator or occupant by, for example and without limitation, releasing the steering wheel or steering shaft, or removing the obstruction from a pinch point of the steering column assembly 118 and the steering wheel assembly 120. At 422, the controller determines whether the external force has been released or removed by, for example, comparing sensor data received from the steering wheel force sensor 215 and/or the steering shaft force sensor 217 to an expected sensor data value obtained when the external force is not applied. In some embodiments, the expected sensor data value is a force approximately equal to zero.

If the controller determines that the force has been released, indicating that there is no longer a pinch condition, the method 400 proceeds to 414 and the stowing and/or folding operation continues until the steering system 112 is stowed within the vehicle console, as discussed herein.

However, if the controller determines that the force has not been released, the method 400 proceeds to 424. At 424, the controller determines whether an elapsed time, as measured by the timer initiated at 416, has exceeded a predetermined threshold. The elapsed time measures how long the pinch force is continuously detected. The predetermined threshold is, in some embodiments, a time limit established to give the occupant or operator a chance to remove the source of the external force on the steering system 112. If the elapsed time has not exceeded the threshold, the method 400 returns to 420 and proceeds as discussed herein.

If the elapsed time has exceeded the threshold, but the force has not been removed or released, the method 400 proceeds to 426. At 426, the controller reverses the folding and stowing motion of the steering column assembly 118 and/or the steering wheel assembly 120 to each assembly's status at the start of the method 400 in preparation for a transition to the driver-controlled vehicle mode of operation. The method 400 then proceeds to 428 wherein the controller completes the transition from an autonomous or semi-autonomous mode of operation to the driver-controller mode of operation and the method 400 proceeds to 408 and the operator retains control of the vehicle. The controller does not retract and/or fold the steering system 112.

FIG. 4 illustrates a method of controlling a vehicle steering system that incorporates both force feedback and displacement feedback. In other embodiments, the method incorporates displacement feedback only.

It should be emphasized that many variations and modifications may be made to the herein-described embodiments, the elements of which are to be understood as being among other acceptable examples. All such modifications and variations are intended to be included herein within the scope of this disclosure and protected by the following claims. Moreover, any of the steps described herein can be performed simultaneously or in an order different from the steps as ordered herein. Moreover, as should be apparent, the features and attributes of the specific embodiments disclosed herein may be combined in different ways to form additional embodiments, all of which fall within the scope of the present disclosure. In various embodiments, each of the methods discussed herein can be used independently or combined together.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or states. Thus, such conditional language is not generally intended to imply that features, elements and/or states are in any way required for one or more embodiments or that one or more embodiments necessarily include logic for deciding, with or without author input or prompting, whether these features, elements and/or states are included or are to be performed in any particular embodiment.

Moreover, the following terminology may have been used herein. The singular forms "a," "an," and "the" include plural referents unless the context clearly dictates otherwise. Thus, for example, reference to an item includes reference to one or more items. The term "ones" refers to one, two, or more, and generally applies to the selection of some or all of a quantity. The term "plurality" refers to two or more of an item. The term "about" or "approximately" means that quantities, dimensions, sizes, formulations, parameters, shapes and other characteristics need not be exact, but may be approximated and/or larger or smaller, as desired, reflecting acceptable tolerances, conversion factors, rounding off, measurement error and the like and other factors known to those of skill in the art. The term "substantially" means that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Numerical data may be expressed or presented herein in a range format. It is to be understood that such a range format is used merely for convenience and brevity and thus should be interpreted flexibly to include not only the numerical values explicitly recited as the limits of the range, but also interpreted to include all of the individual numerical values or sub-ranges encompassed within that range as if each numerical value and sub-range is explicitly recited. As an illustration, a numerical range of "about 1 to 5" should be interpreted to include not only the explicitly recited values of about 1 to about 5, but should also be interpreted to also include individual values and sub-ranges within the indicated range. Thus, included in this numerical range are individual values such as 2, 3 and 4 and sub-ranges such as "about 1 to about 3," "about 2 to about 4" and "about 3 to about 0.5," "1 to 3," "2 to 4," "3 to 5," etc. This same principle applies to ranges reciting only one numerical value (e.g., "greater than about 1") and should apply regardless of the breadth of the range or the characteristics being described. A plurality of items may be presented in a common list for convenience. However, these lists should be construed as though each member of the list is individually identified as a separate and unique member. Thus, no individual member of such list should be construed as a de facto equivalent of any other member of the same list solely based on their presentation in a common group without indications to the contrary. Furthermore, where the terms "and" and "or" are used in conjunction with a list of items, they are to be interpreted broadly, in that any one or more of the listed items may be used alone or in combination with other listed items. The term "alternatively" refers to selection of one of two or more alternatives, and is not intended to limit the selection to only those listed alternatives or to only one of the listed alternatives at a time, unless the context clearly indicates otherwise.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information permanently stored on non-writable storage media such as ROM devices and information alterably stored on writeable storage media such as floppy disks, magnetic tapes, CDs, RAM devices, and other magnetic and optical media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software and firmware components. Such example devices may be on-board as part of a vehicle computing system or be located off-board and conduct remote communication with devices on one or more vehicles.

While exemplary embodiments are described above, it is not intended that these embodiments describe all possible forms encompassed by the claims. The words used in the specification are words of description rather than limitation, and it is understood that various changes can be made without departing from the spirit and scope of the disclosure. As previously described, the features of various embodiments can be combined to form further exemplary aspects of the present disclosure that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes can include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not outside the scope of the disclosure and can be desirable for particular applications.

What is claimed is:

1. A method for controlling a vehicle, the method comprising:
   providing a vehicle steering system, the vehicle steering system comprising a moveable steering column assembly and a moveable steering wheel assembly, a first actuator coupled to the moveable steering column assembly and a second actuator coupled to the moveable steering wheel assembly, the first and second actuators configured to move vehicle steering system from a first position to a second position;
   providing a sensor connected to the vehicle steering system, the sensor configured to measure a steering system force characteristic;
   providing a controller electronically connected to the sensor and the vehicle steering system;
   monitoring, by the controller, sensor data received from the sensor;
   generating, by the controller, a reference model based on a desired output displacement and the sensor data;
   calculating, by the controller, a revised output displacement based on the reference model; and
   automatically generating, by the controller, a first control signal to control the first actuator and a second control signal to control the second actuator.

2. The method of claim 1, wherein the controller calculates the revised output displacement using impedance control.

3. The method of claim 1, wherein the first actuator is configured to translate the steering column assembly from a first steering column position to a second steering column position and the first steering column position is an unstowed steering column position and the second steering column position is a stowed steering column position.

4. The method of claim 1, wherein the second actuator is configured to translate the steering wheel assembly from a first steering wheel position to a second steering wheel position and the first steering wheel position is an unstowed steering wheel position and the second steering wheel position is a stowed steering wheel position.

5. The method of claim 1 further comprising detecting, by the controller, a trigger condition, the trigger condition comprising receipt, by the controller, of an input indicating a mode transition.

6. The method of claim 5, wherein the mode transition is a transition from a driver-controlled vehicle mode of operation to an autonomous or semi-autonomous mode of operation.

7. The method of claim 1, wherein providing a sensor electrically connected to the vehicle steering system comprises providing a first sensor electrically connected to the steering column assembly and a second sensor connected to the steering wheel assembly, the first sensor configured to measure a first force characteristic and the second sensor configured to measure a second force characteristic.

8. The method of claim 7, wherein the first sensor is a force sensor and the first sensor data is data indicative of a first external force applied to the steering column assembly.

9. The method of claim 8, wherein the second sensor is a force sensor and the second sensor data is indicative of a second external force applied to the steering wheel assembly.

10. The method of claim 9 further comprising determining, by the controller, whether a first condition is satisfied, the first condition comprising a release of one or both of the first external force on the steering column assembly and the second external force on the steering wheel assembly.

11. The method of claim 10, wherein if the first condition is not satisfied, determining, by the controller, an elapsed time and comparing, by the controller, the elapsed time to a predetermined threshold and if the elapsed time exceeds the threshold, automatically controlling, by the controller, the first actuator to move the steering column assembly to the first steering column position and automatically controlling, by the controller, the second actuator to move the steering wheel assembly to the first steering wheel position.

12. A method for controlling a vehicle, the method comprising:
   providing a vehicle steering system, the vehicle steering system comprising a moveable steering column assembly and a moveable steering wheel assembly, the moveable steering column assembly comprising a first actuator coupled to the moveable steering column assembly and configured to translate the moveable steering column assembly between a first steering column position and a second steering column position, the moveable steering wheel assembly comprising a first steering wheel member and a second steering wheel member coupled to a shroud assembly, a contact material positioned between the first and second steering wheel members and the shroud assembly, and a second actuator coupled to the moveable steering wheel assembly, the second actuator configured to pivot moveable steering wheel assembly between a first steering wheel position and a second steering wheel position;

providing a first sensor connected to the steering column assembly and a second sensor connected to the steering wheel assembly, the first sensor configured to measure a first force characteristic and the second sensor configured to measure a second force characteristic;

providing a controller electronically connected to the first and second sensors and the vehicle steering system;

monitoring, by the controller, first sensor data received from the first sensor and second sensor data received from the second sensor;

generating, by the controller, a reference model based on a desired output displacement and the first and second sensor data;

calculating, by the controller, a revised output displacement based on the reference model; and automatically generating, by the controller, a first control signal to control the first actuator and a second control signal to control the second actuator.

13. The method of claim 12, wherein the first steering column position is an unstowed steering column position, the second steering column position is a stowed steering column position, the first steering wheel position is an unstowed steering wheel position, and the second steering wheel position is a stowed steering wheel position.

14. The method of claim 12, wherein the first sensor is a force sensor and the first sensor data is data indicative of a first external force applied to the steering column assembly and the second sensor is a force sensor and the second sensor data is indicative of a second external force applied to the steering wheel assembly.

15. The method of claim 12, wherein the controller calculates the revised output displacement using impedance control.

16. The method of claim 12 further comprising determining, by the controller, whether a first condition is satisfied, the first condition comprising a release of one or both of the first external force on the steering column assembly and the second external force on the steering wheel assembly.

17. The method of claim 16, wherein if the first condition is not satisfied, determining, by the controller, an elapsed time and comparing, by the controller, the elapsed time to a predetermined threshold and if the elapsed time exceeds the threshold, automatically controlling, by the controller, the first actuator to move the steering column assembly to the first steering column position and automatically controlling, by the controller, the second actuator to move the steering wheel assembly to the first steering wheel position.

18. A vehicle steering system, comprising:

a moveable steering column assembly, the moveable steering column assembly comprising a first actuator coupled to the moveable steering column assembly and configured to translate the moveable steering column assembly between a first position and a second position;

a moveable steering wheel assembly, the moveable steering wheel assembly comprising a first steering wheel member and a second steering wheel member coupled to a shroud assembly, a contact material positioned between the first and second steering wheel members and the shroud assembly, and a second actuator coupled to the moveable steering wheel assembly, the second actuator configured to pivot moveable steering wheel assembly between a first steering wheel position and a second steering wheel position;

a first sensor connected to the steering column assembly, the first sensor configured to measure a first force characteristic;

a second sensor connected to the steering wheel assembly, the second sensor configured to measure a second force characteristic;

a controller electronically connected to the first and second sensors and the first and second actuators, the controller configured to monitor first sensor data received from the first sensor and second sensor data received from the second sensor;

generate a reference model based on a desired output displacement and the first and second sensor data;

calculate a revised output displacement based on the reference model using impedance control; and automatically generate a first control signal to control the first actuator and a second control signal to control the second actuator.

19. The vehicle steering system of claim 18, wherein the controller is further configured to determine whether a first condition is satisfied, the first condition comprising a release of one or both of the first external force on the steering column assembly and the second external force on the steering wheel assembly and, if the first condition is not satisfied, determine an elapsed time and compare the elapsed time to a predetermined threshold and if the elapsed time exceeds the threshold, automatically control the first actuator to move the steering column assembly to the first steering column position and automatically control the second actuator to move the steering wheel assembly to the first steering wheel position.

* * * * *